A. O. HIGINBOTHAM.
MOTOR VEHICLE DRIVING MECHANISM.
APPLICATION FILED FEB. 8, 1917.
1,297,465.
Patented Mar. 18, 1919.
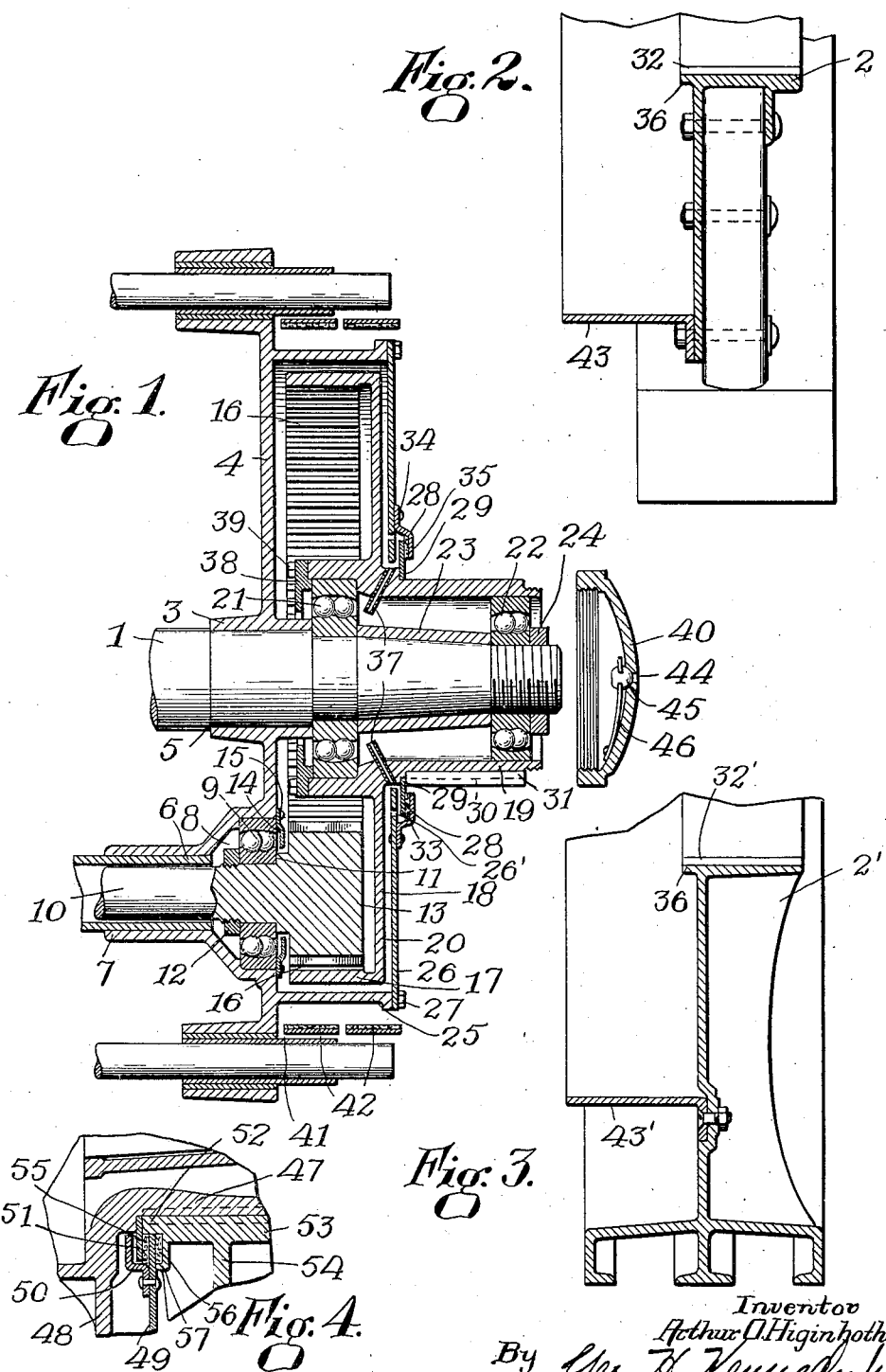
Inventor
Arthur O. Higinbotham
By Geo. H. Kennedy Jr.
Attorney

UNITED STATES PATENT OFFICE.

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

MOTOR-VEHICLE DRIVING MECHANISM.

1,297,465. Specification of Letters Patent. Patented Mar. 18, 1919.

Application filed February 8, 1917. Serial No. 147,321.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Motor Vehicle Driving Mechanism, of which the following, together with the accompanying drawings, is a specification.

The present invention relates to motor vehicles, and in particular to means for transmitting the power from the prime mover to the driving wheels of such vehicles. The invention resides in a construction which is a modification of and improvement upon the construction shown and described in Letters Patent of the United States, No. 1,196,864, issued to me September 5, 1916. Said construction of such issued Letters Patent is concerned with the provision of an internal gear drive for the rear wheels of a motor vehicle, with a dust tight housing therefor so constructed as to maintain the moving parts of said drive in a bath of lubricant. The present invention contemplates the attainment of the foregoing advantages in a construction which is adaptable to the use thereon interchangeably of a steel wheel or a wooden wheel or a wheel of any standard construction. The object of the present invention is attained by such changes and modifications in the structure of the device of said issued Letters Patent as to render it capable of use with any type of wheel, as set forth and described hereinafter, reference being had in connection with said description to the accompanying drawings, in which—

Figure 1 is a transverse sectional view of an internal gear drive mechanism embodying my present invention.

Figs. 2 and 3 are sectional views of standard types of motor vehicle wheels which may be used interchangeably in connection therewith.

Fig. 4 is a fragmentary sectional view, similar to Fig. 1, of a modified form of housing, a wheel hub being shown in position.

Like reference characters refer to like parts in the different figures.

In Fig. 1 the numeral 1 designates a rear "dead" axle, which extends transversely of the vehicle and serves for the support of the same through the usual springs, not shown. Only one end of said axle is shown in the drawing, since the construction and arrangement of parts at each end thereof is identical. Each end of said axle, in a manner to be particularly described, is adapted to receive a driving wheel of the vehicle, of the type shown at 2, in Fig. 2, or 2′ in Fig. 3, said wheels serving in the usual way to support the axle above the road surface. Adjacent each end, axle 1 has keyed or otherwise secured thereon, a hub 3 of a spider 4, said hub preferably engaging at its inner end a shoulder 5 on said axle, whereby inward movement of said spider is prevented.

The two spiders 4, only one of which is shown, support between them a casing 6 which incloses the so called differential gearing of the vehicle, and which carries as usual the gear operated "jack" shafts used to impart rotation to the driving wheels. One end only of said casing 6 is herein shown; said end enters and is supported by a hollow boss 7 formed on the inner face of spider 4 in front of axle 1 and in substantially the same horizontal plane as said axle. Each boss 7 opens into a recess 8 containing the outer end ball bearing 9 for the jack shaft 10, the latter having a shoulder 11 against which the inner raceway of said ball bearing is held by means of a threaded ring 12. A pinion 13 is carried on the end of said shaft, and between said pinion and the ball bearing 9 is preferably disposed a ring 14, attached by screws 15 to the spider 4 and acting to prevent the escape of lubricant from the chamber containing said ball bearing, said chamber receiving lubricant from the differential casing 6.

The pinion 13 is in mesh with an internal gear 16 which is formed on the rim 17 of a rotatable hub structure 18, the latter having an elongated hub portion 19 surrounding the axle 1 with an annular web portion 20 connecting said hub portion with rim 17. The hub portion 19 is preferably journaled on spaced ball bearings 21 and 22, the former abutting hub 3 of spider 4 and spaced from the bearing 22 by the usual spacing sleeve 23. Said bearings are retained in position by a nut 24 threaded on the end of dead axle 1.

To form a chamber completely inclosing the internal gear 16 and the pinion 13, the spider 4 has an outwardly projecting rim or flange 25 surrounding and inclosing rim 17 of the rotating hub structure 18. An annular plate 26 is attached at its outer edge by a series of bolts 27 to the end of rim 25, thereby forming an oil tight annular joint between these parts. The inner edge of plate 26 is carried into close proximity to the hub portion 19, so that the running joint, constituted as hereinafter described, is brought as close as possible to the axle 1, thus insuring the maintenance of a supply of lubricant for gear 16 and pinion 13 of a considerable depth therein, there being no escape for the lubricant until it rises to the height of said running joint.

Said running joint, between the stationary plate 26 and the rotating hub structure 18 is preferably formed by means of an oil retaining ring 28, the inner edge of which is seated on a shoulder 29 of hub portion 19. Beyond said ring the hub portion 19 is longitudinally slotted at 30 for the reception of a key or spline 31, the latter serving to lock a wheel hub thereon, namely, either of the correspondingly slotted hubs 32 or 32' of the wheels 2 and 2', Figs. 2 and 3, or any wheel having a hub fitting the hub portion 19 and slotted to receive the spline 31.

In the assembly of the structure, the oil retaining ring 28 is first seated against its shoulder 29 and thereafter an annular plate 33 is bolted or riveted as at 34 to plate 26, forming an annular space to receive said ring, which space is preferably filled with a suitable packing material 35. Thereafter, when the hub 32 or 32' of a wheel is put in place, an integral projection 36 thereof closes the space containing the packing 35 and at the same time bears against ring 28 to hold the latter firmly in place, so that said ring in reality rotates as a part of hub portion 19. The running joint thus formed by ring 28, plates 26 and 33, and packing 35 minimizes the escape of oil from the gear chamber formed by spider 4, flange 25, and plate 26; no oil can escape from said chamber until it rises therein to a height above holes 26' of plate 26, and then it passes into the space containing packing 35. The gear chamber communicates, through a series of tubes 37, with the interior of hub portion 19, which contains the bearings 21 and 22. An annular plate 38 bolted at 39 to the inner end of hub portion 19 acts to retain lubricant within said hub portion approximately at the level of the ends of tubes 37.

After a wheel, such as 2 or 2' has been keyed on hub portion 19, a hub cap 40, of any well known type is screwed into place, to hold the wheel against axial movement and to close the space within hub portion 19 against the escape of lubricant at its outer end. A wheel, such as 2 or 2' is readily assembled, simply by detaching said hub cap, and it will be seen that the structure, while possessing all the advantages of the device shown and described in my aforesaid issued Letters Patent, is at the same time readily adaptable to the mounting of any desired type of wheel thereon, without changing or adjusting its parts. Beyond the flange 25, the spider 4 may provide the usual annular space 41 to receive brake shoes 42, 42, for coöperation with a brake drum 43 or 43' carried by the wheel 2 or 2'.

The hub cap 40 may serve for the introduction of lubricant to the entire structure as herein described, through an aperture 44 therein, which is suitable for the insertion of an oil gun, or the like. A valve 45, normally held against said aperture by a yielding spring 46, serves to prevent the entrance of dust and dirt therethrough. Lubricant introduced through the aperture 44 partially fills the space inclosed by the hub portion 19, and thus effectually lubricates the bearings 21 and 22. The further introduction of oil to said space causes an overflow through the tubes 37 or over the edge of plate 38, the oil in either case passing into the gear housing and maintaining the lubrication of gear 16 and pinion 13. All the parts of the structure are thus effectually lubricated by the oil initially introduced through the hub cap. The running joint which forms the only possible escape for any oil is furthermore brought much nearer the axis of rotation than in the structure of my aforesaid Letters Patent, and, therefore, the peripheral speed of the rotating part of said joint being less, the wear is minimized.

In Fig. 4 I have illustrated a modification of the running joint between the stationary gear housing and the rotatable hub structure, the tubular hub portion of the latter being designated by numeral 47, and the web portion, carrying the internal gear, not shown, by the numeral 48. The outer wall of the housing is formed by a plate 49, corresponding substantially to plate 26 of Fig. 1. Attached to the inner side of plate 49 is the annular plate 50, forming a space adapted to receive a ring 51, which like the ring 29 of Fig. 1, is held in place by an annular projection 52 on the hub 53 of a wheel 54, when said wheel is mounted in place on the hub structure, as shown. Packing material 55 is preferably inserted between ring 51 and plate 49, and in addition, packing material 56 may be inserted in the annular space formed on the outer side of plate 49 by a recessed annular projection 57 of hub portion 53. The operation and lubrication of the form of device shown in Fig. 4 is substantially the same as that of the device of Fig. 1.

I claim,

1. In a motor vehicle, a dead axle, a rotatable hub structure providing an outer portion for the detachable and interchangeable attachment thereto of a driving wheel, a nonrotatable housing, mechanism for rotating said hub structure inclosed in said housing, and an annular plate carried by said hub structure, coöperating with a driving wheel attached to the hub structure and with the nonrotatable housing to make a dust-tight running joint.

2. In a motor vehicle, a dead axle, a rotatable hub structure journaled thereon, and providing an outer portion for the detachable and interchangeable attachment thereto of a driving wheel, an internal gear carried by and surrounding the inner portion of said hub structure, a driving pinion for said gear, a non-rotatable housing, supported by said axle, inclosing said gear and pinion, said housing comprising an inner plate attached to said axle, and an outer plate secured to said inner plate and having a dust-tight running joint with said hub structure only when a driving wheel is in place thereon.

3. In a motor vehicle, a dead axle, a rotatable hub structure, inclosing a lubricant chamber, journaled on the dead axle, an internal gear attached to said hub structure, a driving pinion for said gear, a non-rotatable housing inclosing said gear and pinion, means for making an annular running joint between said housing and said hub structure within the circumference of said internal gear, to maintain a predetermined level of lubricant within said housing, and means establishing communication between said lubricant chamber and the interior of said housing.

Dated this 29th day of January, 1917.

ARTHUR O. HIGINBOTHAM.

Witnesses:
NELLIE WHALEN,
PENELOPE COMBERBACK.

Copies of this patent may be obtained for five cents each, by addressing the "Commissioner of Patents, Washington, D. C."